April 16, 1968     W. R. BORDER, JR     3,377,752
SELF-ANGLING ADJUSTING CRANKSHAFT REST
Filed Feb. 1, 1966     2 Sheets-Sheet 1
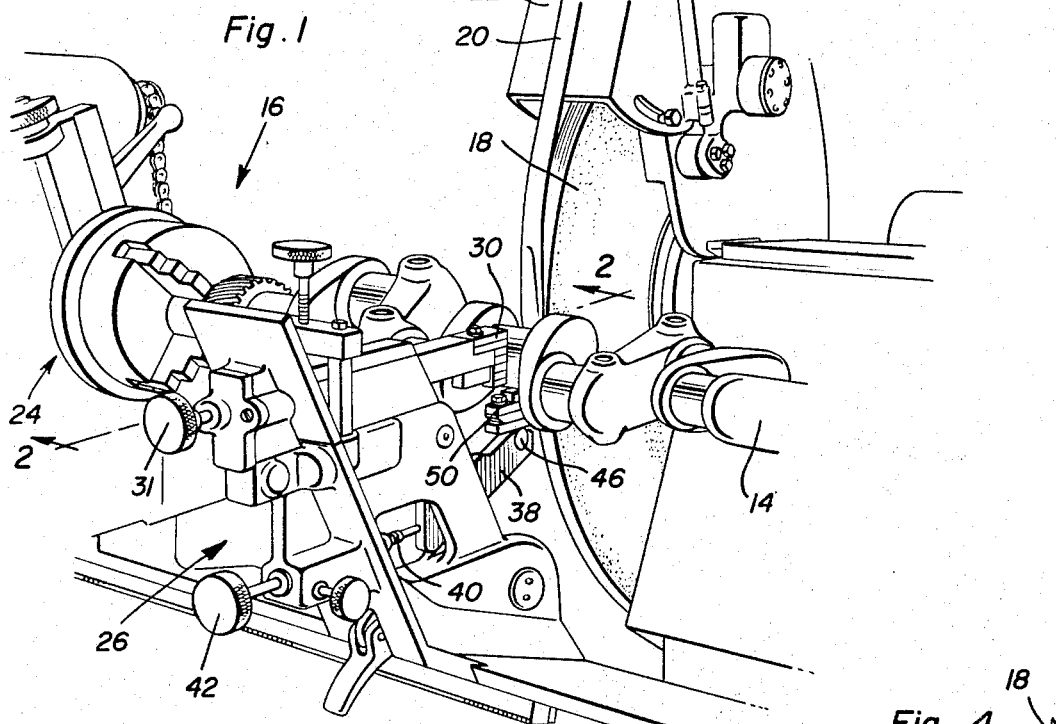
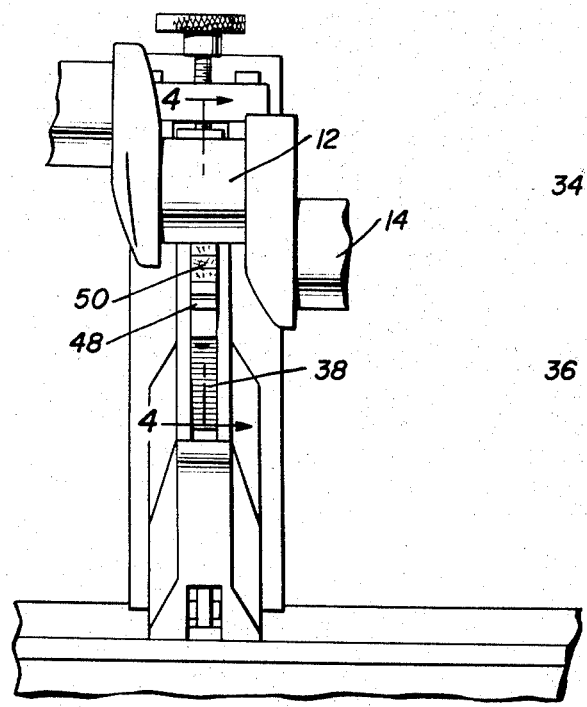
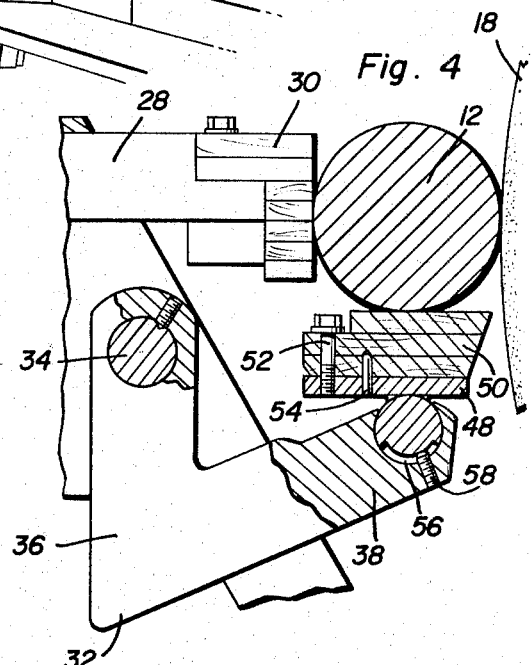
William R. Border, Jr.
*INVENTOR.*

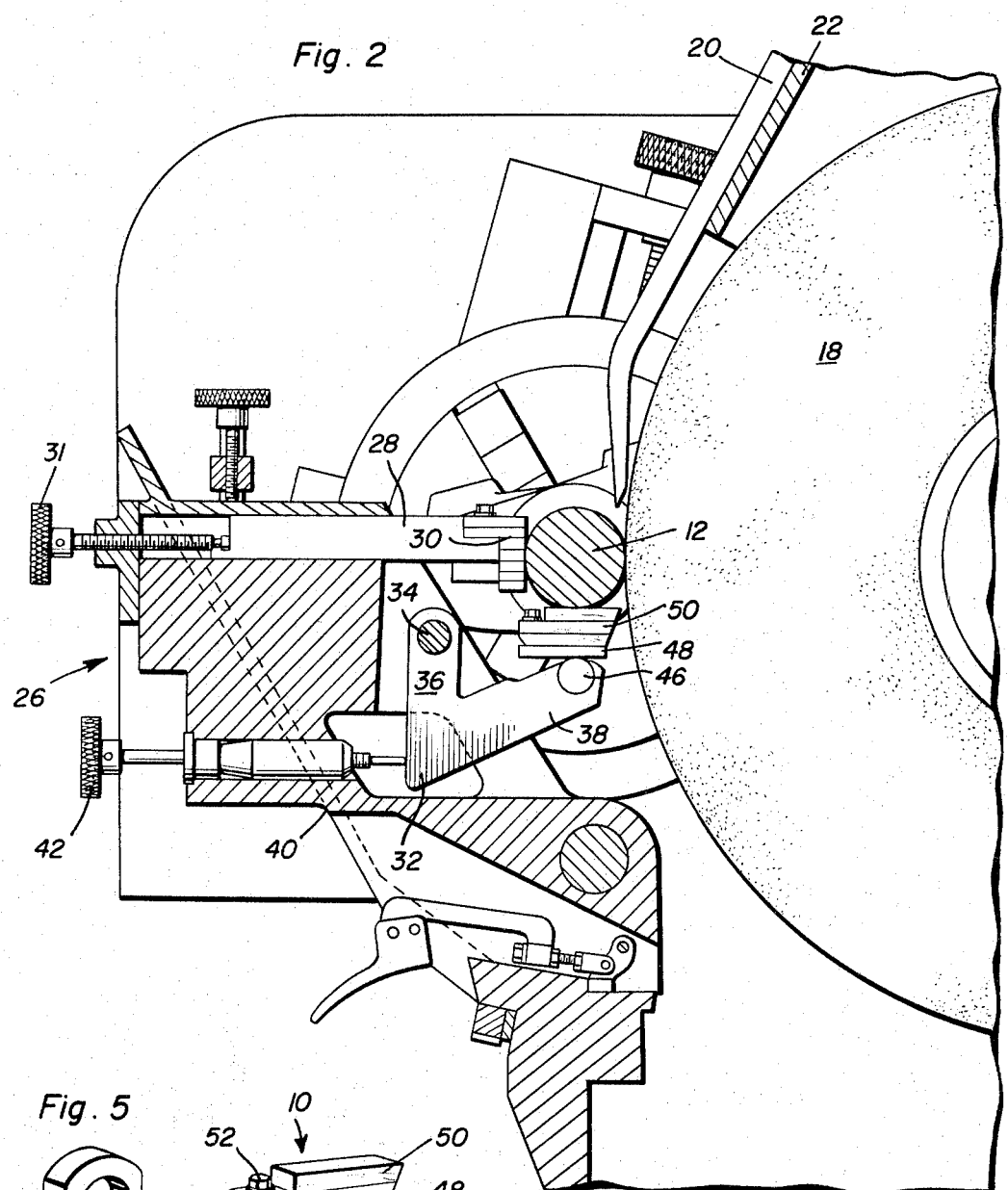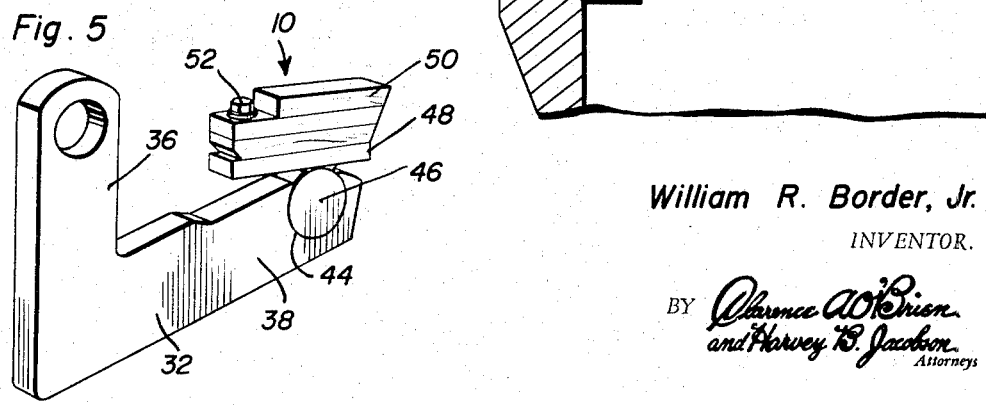

United States Patent Office 3,377,752
Patented Apr. 16, 1968

3,377,752
SELF-ANGLING ADJUSTING CRANKSHAFT REST
William R. Border, Jr., R.D. 2, Box 356,
Bedford, Pa. 15522
Filed Feb. 1, 1966, Ser. No. 524,174
3 Claims. (Cl. 51—238)

ABSTRACT OF THE DISCLOSURE

A supporting plate with a block of bearing material thereon for supportingly engaging a crankshaft journal. The supporting plate is pivotally connected to a quick upswing arm on a crankshaft regrinder for enabling the block of bearing material to exert a vertical force on crankshaft journals of various diameters.

---

The present invention generally relates to a crankshaft rest that is employed on the steady rest normally provided on a crankshaft regrinder and is specifically disclosed for use in combination with a Van Norman Model 477 crankshaft regrinder although the device is well adapted for use with various steady rests employed in this type of machine which are commonly referred to as a quick upswing arm which basically includes a pivotally supported arm and a fixed stationary support mounted on the swing arm which is engaged with the crankshaft journal by means of a rocker arm feed screw of various types.

It is an object of the present invention to provide a self-angling adjusting rest for use on a quick upswing arm to enable the rest to properly engage the crankshaft journal.

In present day structures, with one end of the rocker arm pivoted and the crankshaft contact support disposed in a fixed position on the arm, various factors cause the angle of contact with the crankshaft to vary. For example, as the diameter of the crankshaft varies and as wear occurs on the contact, the angle of contact will vary thus providing a tendency of either forcing the crankshaft into the grinding wheel or pulling the crankshaft away from the grinding wheel and into the cross-feed crankshaft support of the steady rest thus sometimes causing the crankshaft grinder to cause chatter and an out-of-round condition on the journal when journals are being ground and in the case of main bearing journals which are ground in alignment, such chatter and out of roundness will be transmitted to the other journals as they are ground. When the plane of the lower rocker arm crankshaft support tends to deviate from a 90° angle from the cross-feed support which happens when the diameter of the journal increases or decreases or wear on the support shoe occurs, the greater the angle of deviation, the more tendency there is to produce chatter and out of roundness. The self-angling adjusting crankshaft rest of the present invention overcomes this problem by being supported in a self-aligning cradle thereby enabling the rest to move freely to support the crankshaft in a vertical direction without shoving the crankshaft journal into the grinding wheel or without pulling the crankshaft journal away from the grinding wheel inasmuch as with the self-angling adjusting crankshaft rest, the rest will support the crankshaft journal in a vertical approximately 90° angle in relation to the cross-feed crankshaft support.

The closer that the angle of support stays to 90°, the better results of the grinding operation inasmuch as chatter and out of roundness is substantially eliminated.

Another object of the present invention is to provide a self-angling adjusting crankshaft which is quite compact in construction, easily allows the use of a sizing gauge to be placed on the journal being ground to check the shaft for chatter and out of roundness. The present invention does not involve the use of any adjustments inasmuch as the crankshaft rest will automatically adjust itself to its proper position when it comes into contact with the crankshaft.

Another important object of the present invention is to provide a self-angling adjusting crankshaft rest which requires the consumption of less time by the operator when grinding the shaft inasmuch as the shaft is properly and better supported and faster stock removal can be accomplished without damage to the journal. With this invention, it is only necessary that the operator turn the adjusting screw for the rocker arm to swing the crankshaft shoe support into the crankshaft as the grinding wheel removes stock from the crankshaft and supports it in a desired positon that will allow the crankshaft to be ground in a more nearly round and true method than with present-day steady rests.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmental perspective view of a crankshaft regrinder illustrating the self-angling adjusting crankshaft rest of the present invention associated with the components of the regrinder and the crankshaft journal;

FIGURE 2 is a sectional view taken substantially upon a plane passing along section line 2—2 of FIGURE 1 illustrating further structural details of the crankshaft rest of the present invention;

FIGURE 3 is an elevational view of the crankshaft rest as observed from the side of the crankshaft journal which is engaged by the grinding wheel;

FIGURE 4 is a detail sectional view taken substantially upon a plane passing along section line 4—4 of FIGURE 3 illustrating further structural details of the crankshaft rest; and FIGURE 5 is a perspective view of the rocker arm and crankshaft rest of the present invention illustrating the structural interrelationship therebetween.

Referring now specifically to the drawings, the numeral 10 generally designates the self-angling adjusting crankshaft rest of the present invention which is employed to engage a journal 12 on a conventional crankshaft 14 when it is mounted in a machine 16 known as a crankshaft regrinder and which includes briefly a grinding wheel 18 which is power operated and adjustable in a known manner and is provided with the usual coolant nozzle 20 and shield or cover 22. The crankshaft 14 is engaged with the headstock assembly 24 in the usual manner and also is associated with the steady rest assembly 26. The steady rest includes a cross-feed support or slide 28 having a shoe 30 thereon engaging the crankshaft journal and also includes a rocker arm 32 supported on a pivot shaft 34 and including acute angularly oriented arms 36 and 38. An adjusting screw 40 having an operating knob 42 associated therewith swings the arm 32 about the shaft 34 and this type of arm is generally known as a quick upswing arm and is normally provided with a stationary or fixed rest or contact thereon for engaging the crankshaft journal 12.

The arm 38 is provided with a substantially cylindrical notch 44 having a portion of the periphery thereof communicated with the upper surface of the arm 38 for rotatably receiving a substantially cylindrical bearing support member 46 affixed rigidly to a support plate 48 so that the support plate 48 is substantially tangential to the cylindrical support member 46 and normally disposed above the arm 38 so that the support plate 48 may rock about a horizontal axis generally perpendicular to the center of the cylindrical support member 46 due to the relatively narrow point of interconnection between the support plate 48 and the cylindrical support 46.

Mounted on the support plate 48 is a laminated crankshaft rest 50 constructed of a plurality of bonded layers of lignum vitae or any other suitable material conventionally employed as a rest for engaging the crankshaft journal 12. The rest 50 is attached to the supporting plate 48 by a suitable retaining bolt 52 or the like and an aligning pin 54 also interconnects the plate 48 and the rest 50 to retain the rest 50 in position on the supporting plate 48. To limit the pivotal movement of the supporting plate 48, the cylindrical support 46 is provided with a peripheral groove 56 therein receiving a setscrew 58 which extends inwardly from the bottom of the arm 38 thereby limiting the swivelling or self-angling movement of the rest 50.

As illustrated in FIGURE 4, the rest 50 contacts the crankshaft journal in substantially 90° relation to the contact between the crankshaft journal 12 and the cross-feed support or rest 30 which is also constructed of the same laminated material. Thus, movement of the grinding wheel which, of course, exerts a thrust on the crankshaft journal will be counteracted by the rest 50 and the rest 30. As the rest 50 wears or reduction in the size of the crankshaft journal occurs from the grinding operation, the rocker arm 32 is adjusted by manipulating the knob 42 and the point of contact with the crankshaft journal will be retained substantially in 90° relation to the point of contact with the cross-feed rest 30. The knob 31 on the cross-feed rest 30 would also be manipulated to compensate for wear on the rest or reduction in size of the crankshaft journal from the grinding operation to maintain a firm support. When the rest 50 engages a journal of different diameters, the point of contact still will be retained substantially at 90° in relation to the point of contact with the cross-feed rest 30 and the grinding wheel so that the force exerted on the crankshaft journal 12 will be substantially in a vertical direction rather than toward or away from the grinding wheel. When a force is exerted on the crankshaft journal in a direction other than vertical, such force will either tend to force the crankshaft journal toward the grinding wheel or pull the crankshaft journal away from the grinding wheel whereas the self-angling and adjusting crankshaft rest 50 of this invention will at all times exert a vertical force on the crankshaft journal to prevent the crankshaft journal from being forced towards the grinding wheel or pulled away from the grinding wheel thereby substantially eliminating or at least materially reducing the tendency of the grinding wheel to grind the journal in an out-of-round condition and also substantially eliminate or materially reduce the tendency of the grinding wheel to introduce a chatter into the grinding operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-angling adjusting crankshaft rest for use on a crankshaft grinding apparatus comprising a block of bearing material in vertical supporting engagement with the bottom surface of a crankshaft journal being ground, and means rockably supporting the block from a support to enable the support to assume substantially a tangential relation to the crankshaft journal at the bottom surface thereof to exert a vertical thrust on the crankshaft support, said means for supporting the block of material including a cylindrical support member rigid with the block of material, and a support arm having a partially cylindrical recess therein for rotatably journalling the cylindrical support for enabling limited pivotal movement thereof in relation to the support arm.

2. For use in combination with a crankshaft regrinder having a rotatable grinding wheel, a cross-feed crankshaft contacting support member and a rocker arm including a quick upswing arm extending to a position under the crankshaft journal to be ground by the grinding wheel; that improvement comprising a supporting plate overlying the free end portion of the quick upswing arm, means connecting the supporting plate to the quick upswing arm for pivotal movement about an axis substantially parallel to the axis of the crankshaft journal being ground, and block means mounted on the support plate in contact with the crankshaft journal for supportingly engaging the same with the pivotal support for the support plate enabling the force exerted on the crankshaft journal to be in a vertical direction substantially in 900° relation to the contact between the cross-feed support and the crankshaft journal, said support plate including a depending cylindrical projection, said quick upswing arm having a substantially cylindrical socket therein receiving the projection and enabling pivotal movement of the support plate, said block means on the support plate including a block of bearing material with the pivotal support of the support plate enabling the bearing material to exert a vertical force on crankshaft journals of various diameters and to exert a vertical force on the crankshaft journal even though the bearing material becomes worn.

3. For use in combination with a crankshaft regrinder having a rotatable grinding wheel, a cross-feed crankshaft contacting support member and a rocker arm including a quick upswing arm extending to a position under the crankshaft journal to be ground by the grinding wheel; that improvement comprising a supporting plate overlying the free end portion of the quick upswing arm, means connecting the supporting plate to the quick upswing arm for pivotal movement about an axis substantially parallel to the axis of the crankshaft journal being ground, and block means mounted on the support plate in contact with the crankshaft journal for supportingly engaging the same with the pivotal support for the support plate enabling the force exerted on the crankshaft journal to be in a vertical direction substantially in 90° relation to the contact between the cross-feed support and the crankshaft journal, said support plate including a depending cylindrical projection, said quick upswing arm having a substantially cylindrical socket therein receiving the projection and enabling pivotal movement of the support plate, said block means on the support plate including a block of bearing material with the pivotal support of the support plate enabling the bearing material to exert a vertical force on crankshaft journals of various diameters and to exert a vertical force on the crankshaft journal even though the bearing material becomes worn, said block means being a block of bearing material, means removably mounting the block on the support plate to enable replacement, said means connecting the supporting plate to the quick upswing arm including a socket opening to the top surface of the arm, said supporting plate including a depending projection pivotally received in said socket.

References Cited

UNITED STATES PATENTS

| 2,286,620 | 6/1942 | Hollengreen | 51—238 |
| 2,419,406 | 4/1947 | Koebbe | 51—238 |
| 2,791,872 | 5/1957 | Wineka | 82—38 |
| 3,319,497 | 5/1967 | Needham et al. | 82—38 |
| 3,330,074 | 7/1967 | Stuckey | 51—105 |

OTHELL M. SIMPSON, *Primary Examiner.*